(12) United States Patent
Lopke

(10) Patent No.: US 6,934,890 B2
(45) Date of Patent: Aug. 23, 2005

(54) ERROR CODE INDEXING AND INTERPRETATION APPARATUS AND METHOD

(75) Inventor: Michael S. Lopke, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 532 days.

(21) Appl. No.: 09/815,192

(22) Filed: Mar. 19, 2001

(65) Prior Publication Data

US 2002/0133755 A1 Sep. 19, 2002

(51) Int. Cl.⁷ .................................................. G06F 11/00
(52) U.S. Cl. ......................................... 714/48; 714/57
(58) Field of Search ................................ 714/5, 57, 48, 714/44

(56) References Cited

U.S. PATENT DOCUMENTS

| | | | | | |
|---|---|---|---|---|---|
| 5,303,163 | A | * | 4/1994 | Ebaugh et al. | 700/274 |
| 5,892,898 | A | * | 4/1999 | Fujii et al. | 714/57 |
| 6,308,283 | B1 | * | 10/2001 | Galipeau et al. | 714/6 |
| 6,384,848 | B1 | * | 5/2002 | Kojima et al. | 345/808 |
| 6,519,640 | B2 | * | 2/2003 | Hattori et al. | 709/224 |
| 6,526,529 | B1 | * | 2/2003 | Miksovsky et al. | 714/57 |
| 6,631,247 | B1 | * | 10/2003 | Motoyama et al. | 399/8 |
| 2002/0112202 | A1 | * | 8/2002 | Buzby et al. | 714/48 |
| 2002/0129305 | A1 | * | 9/2002 | Ahrens et al. | 714/57 |
| 2002/0131067 | A1 | * | 9/2002 | Cox | 358/1.14 |
| 2002/0133755 | A1 | * | 9/2002 | Lopke | 714/43 |
| 2003/0014515 | A1 | * | 1/2003 | Motoyama et al. | 709/224 |
| 2003/0195982 | A1 | * | 10/2003 | Motoyama et al. | 709/238 |

* cited by examiner

Primary Examiner—Bryce P. Bonzo

(57) ABSTRACT

Error code indexing and interpretation apparatus (10) includes a first device (12) containing operating error codes (14) and configured to send an error code (14) on the occasion of a first device (12) operating error. A second device (16) is connected to the first device (12) and contains first device parameters (28). Second device (16) sends and receives information and is configured to join the error code (14) with the device parameters (28) and to alert a user upon receipt of an error code (14) from first device (12). A device error code database (30) is connected to the second device (16) for storing an index of device error codes (34) and associated error code correction procedures (36). Device error code database (30) is configured to display an associated error code correction procedure (36) upon the receipt of an error code (14) joined with the device parameters (28).

20 Claims, 2 Drawing Sheets

Information that can be encoded and used for Indexing

- 46 — Product type — ie: printer, scanner, pc
- 48 — Product family — ie: 2100, 3500 printer
- 50 — Configuration — ie: network printer, memory
- 52 — Software — ie: versions, patches, drivers
- 54 — Product model#
- 14 — Error code
- 56 — Serial #
- •
- •
- •

Information that can be encoded and used for Indexing

- 46 — Product type — ie: printer, scanner, pc
- 48 — Product family — ie: 2100, 3500 printer
- 50 — Configuration — ie: network printer, memory
- 52 — Software — ie: versions, patches, drivers
- 54 — Product model#
- 14 — Error code
- 56 — Serial #
- •
- •
- •

ERROR CODE INDEXING AND INTERPRETATION APPARATUS AND METHOD

TECHNICAL FIELD

This invention relates to an error code indexing and interpretation apparatus and method. In particular, the invention relates to an error code indexing and interpretation apparatus and method for use with integrated machine systems with multiple devices.

BACKGROUND OF THE INVENTION

Every day sees the introduction of more and more marvels of the technological revolution. As machines become ever more sophisticated, the tension between user and machine has increased. In particular, the tension between a user and a machine is generally highest when the machine breaks down. What rudimentary instructions that are provided are typically directed toward instructing a user on how to set up the machine for initial use. Very little, if any, instruction is provided explaining how the machine works and how to repair it when it does not work. In fact, the most a user generally has when a machine breaks down is a cryptic list of error codes at the very back of the instruction manual.

Currently, as a result, upon the occasion of a machine breakdown, the solution path for a user attempting to correct the problem without calling maintenance, is as follows. A user detects a device error or other support issue. At that point, the user must determine the following: product identification, problem, configuration of device, and so forth, as best as he or she is able. If the problem can not be fixed by referring to the instruction manual, the user must then contact support personnel for assistance. Support can be internal or external. In a common case, a user opens a browser and navigates to a customer care/support site on the World Wide Web. Once at the appropriate web site on the Internet, however, the user must still navigate through the web site to the correct product and locate the correct error code solution page.

Assuming the user can decipher the error codes, the user must test the solution in hopes he or she received the right answer to the right question. In short, the current device breakdown solution process is difficult, complicated, and time-consuming and places most of the burden of solving the problem on the user.

Thus, there is a need in the art for providing an error code indexing and interpretation apparatus and method that quickly and easily connects a user with appropriate machine repair remedies. It, therefore, is an object of this invention to provide an error code indexing and interpretation apparatus and method for use in integrated machine systems with multiple devices.

SHORT STATEMENT OF THE INVENTION

Accordingly, the error code indexing and interpretation apparatus of the present invention includes, in an integrated machine system with multiple devices, a first device containing operating error codes configured to send an error code on the occasion of a first device operating error. A second device, containing first device parameters, is connected to the first device for sending and receiving information and is configured to join an error code with the device parameters upon receipt of an error code from the first device. A device error code database is connected to the second device for storing an index of device error codes and associated error code correction procedures and is configured to display an associated error code correction procedure upon the receipt of an error code joined with the device parameters.

In a preferred embodiment, the second device is connected to the device error code database through a remote network. In a further preferred embodiment, the second device is connected to the device error code database through a web site on the Internet.

In another preferred embodiment, a method of indexing and interpreting error codes, in an electronically integrated business system with multiple business devices, includes the steps of providing at least one first machine with the error codes. The first machine is configured to send an error code on the occasion of a first machine operating error. A second machine, for sending and receiving information, is connected to the first machine and first machine parameters are stored on the second machine. The second machine is configured to join the error code with the appropriate first machine parameters on receipt of the error code from the first machine. A machine error code database is connected to the second machine and an index of machine error codes and associated error code correction procedures are stored on the machine error code database. The machine error code database is configured to display an associated error code correction procedure upon receipt of an error code joined with the appropriate machine parameters.

In a preferred embodiment, the method includes the step of connecting the second machine to the machine error code database through a web site on the Internet. In a further preferred embodiment, the first machine is selected from a group including: printer, scanner, Mopier/copier, facsimile and phone.

In another preferred embodiment, in an electronically integrated business system with multiple business devices, computer code recorded on computer readable medium for indexing and interpreting error codes, includes computer code for a plurality of first machines containing operating error codes and for configuring the first machines to send an error code on the occasion of a first machine operating error. Computer code for a second machine for receiving and sending data is linked to the plurality of first machines and stores parameters for the first machines while also joining an error code with the appropriate first machine parameters and alerting a user upon receipt of the error code. Computer code for a machine error code database is linked to the second machine for indexing machine error codes and storing associated error code correction procedures. The computer code identifies the associated error correction procedure in response to the receipt of a particular error code joined with the appropriate plurality of first machines parameters from the second machine.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figures 1, 2:
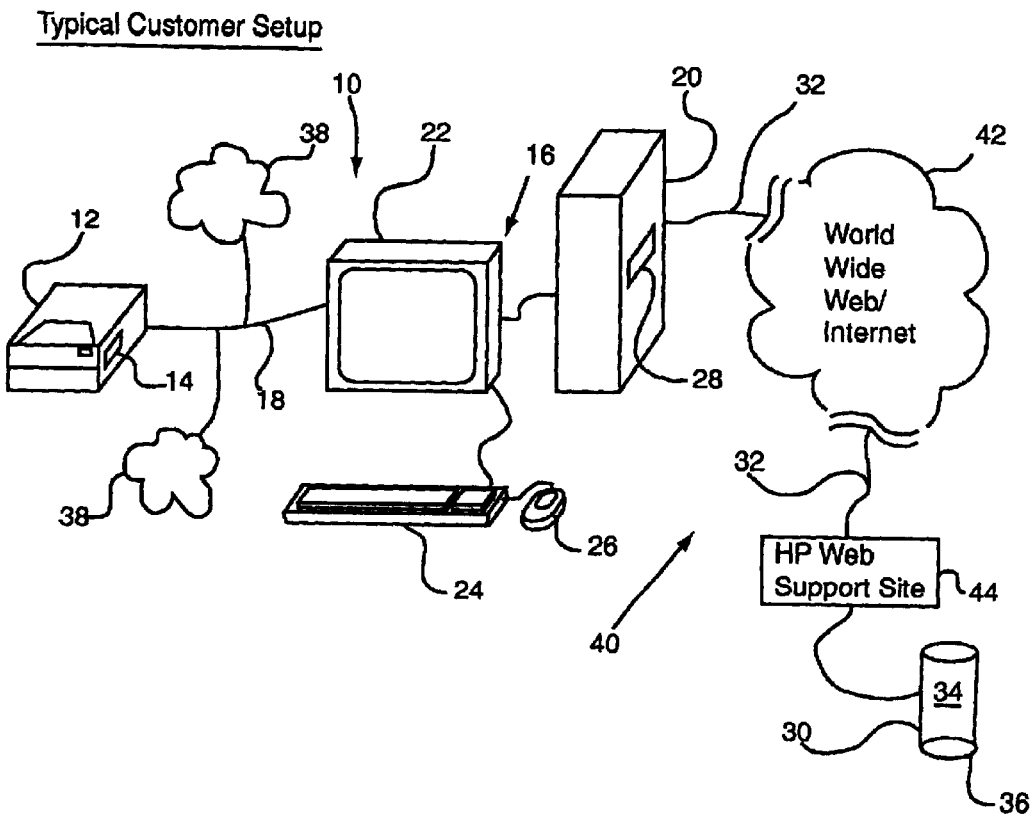
FIG. 1 is a schematic diagram of a preferred embodiment of the error code indexing and interpretation apparatus of the present invention.
FIG. 2 is a chart of representative indexing information of the present invention.
Figure 4:
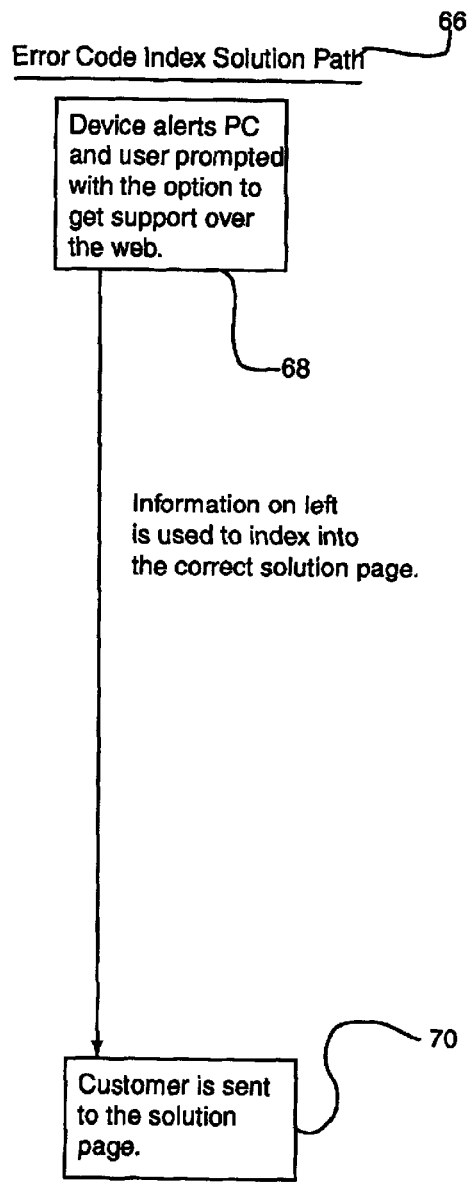
FIG. 4 is a flowchart of the solution path of the present invention.

The preferred embodiment of the present invention is illustrated by way of the example in FIGS. 1, 2, and 4. With specific reference to FIG. 1, error code indexing and interpretation apparatus 10 of the present invention includes, in integrated machine systems with multiple devices, a first device 12 containing operating error codes 14. First device 12 is configured to send an error code 14 in the event of a first device 12 operating error. First device 12 is joined to second device 16 by means of connection 18.

In a preferred embodiment, second device 16 is a personal computer of any type now known or hereafter developed including computer processing unit 20, monitor 22, keyboard 24 and mouse 26, for example. The second device 16 contains first device parameters 28. First device parameters 28, as will be discussed more fully hereafter with reference to FIG. 2, include all the identifying information for first device 12. Second device 16 sends and receives information as is known in the art. Additionally, second device 16, in accordance with the present invention, is configured to join an operating error code 14 with first device parameters 18 and to alert a user upon the receipt of an operating error code 14 from first device 12 through connection 18.

Second device 16 is connected to a device error code database 30 by connection 32. Device error code database 30 stores an index of device error codes 34 and associated error code correction procedures 36 for devices. Device error code database 30 is configured to display an associated error code correction procedure 36 upon the receipt, through connection 32, of an error code 14 joined with the device parameters 28.

As used herein, the term "device" includes any machine, business tool, or the like. In a preferred embodiment, devices are selected from a group including: printer, scanner, Mopier/copier, facsimile and phone. Obviously, any device now known or hereafter developed is provided for within the scope of the present invention.

In a further preferred embodiment, multiple devices 38 are joined to second device 16 by connection 18. In this regard, connection 18, as well as connection 32, may be direct physical i.e. wired, connections or wireless connections as is known in the art. As a result, in a preferred embodiment, second device 16 may be connected to device error code database 30 through a remote network 40. Remote network 40, in a preferred embodiment includes a local intranet network and an Internet network as well. That is to say, second device 16 may be joined with device error code database 30 by connection 32 in a local intranet. On the other hand, in a preferred embodiment, second device 16 is connected to device error code database 30 by means of connection 32 to the World Wide Web/Internet 42 and Web support site 44.

In another preferred embodiment, first device 12 actually resides on second device 16. In this embodiment, the typical lengthy remote connection 18 between the PC and the printer, for example, is eliminated altogether by combining first device 12 with a second device 16. In another preferred embodiment first device 12 and device error code database 32 reside on, or are incorporated within, second device 16. Nonetheless, the essential elements of the error code indexing and interpretation apparatus 10 of the present invention remain.

Referring now to FIG. 2 a chart of representative indexing parameters of the present invention is illustrated. Initially, any appropriate indexing parameters that are deemed useful may be used including but not limited to: product type 46, product family 48, configuration 50, software 52, product model number 54, product serial number 56, and operating error codes 14. All of the operating error codes 14 are included in the index of device error codes 34 on device error code database 30. Likewise, all of the device parameters 28 i.e. product type 46, product family 48, and so forth, are contained in device parameters 28 on second device 16.

By way of further explanation of the type of information utilized for the creation of device parameters 28, product type 46, for example, is used to identify the printer, scanner, PC, or other machine device. Product family 48 is used to identify machine device number 2100, 3500, and so forth. Configuration 50 identifies networked, memory, and so forth. Software 52 identifies versions, patches, drivers, and the like.

Figure 3:
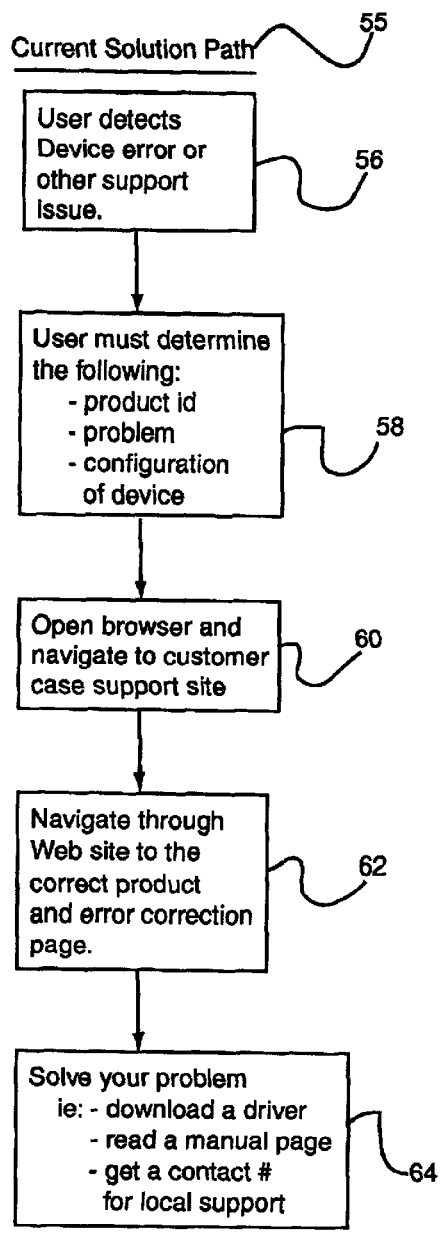
FIG. 3 is a flowchart of a representative Prior Art solution path.

Referring now to FIG. 3, the prior art/current solution path 55 faced by users of machines that have stopped functioning correctly begins with block 56 wherein the user detects a device error or other support issue. Currently, on his own, with minimal instructions as discussed above, the user must determine the following: product identification i.e. product type 46, product family 48, configuration 50 and so forth in block 58. For the purposes of example, assuming he is connected to the Internet 42, a user opens a browser and navigates to a customer care/support site 44 in block 60. The next typical step in block 62 requires the user to navigate through web site 44 to the correct product and error correction page. It is not until block 64 when a user attempts to solve the machine malfunction with the information that was contained in the typical solution path, that the user determines whether or not they knew the right questions to ask. That is, in the typical case, a user may be directed to download a driver, read a manual page, or contact a local support provider. Only then can they try the "solution" that they found. Because users are typically unfamiliar with error codes and the particular parameters of the machines they are using, the prior art "solution path" 55, instead, is often a path to frustration.

In contrast, referring now to FIG. 4, the error code index solution path 66 begins in block 68 with the second device 16 alerting the user that an operating error code 14 has been received from device 12. At that point, the user is prompted, by way of a pop-up dialog box as is known in the art, for example, to obtain a solution to the problem. In accordance with the error code indexing and interpretation apparatus 10 of the present invention, second device 16 has already joined operating error code 14 received from first device 12 with the appropriate first device parameters 28. The user is spared the frustrating and often fruitless search for this cryptic information. In a preferred embodiment, the user connects with the index of device error codes 34 contained on device error code database 30 through Internet 42 via Web support site 44. By the click of a mouse 26, for example, the user is instantly connected with the appropriate associated error correction procedure 36 for the appropriate device 12 in accordance with the correct device parameters 28 in block 70. With reference to the prior art FIG. 3, not only are blocks 58, 60 and 62 eliminated altogether, but a more certain solution is almost always provided.

While the present invention has been disclosed in connection with the preferred embodiment thereof, it should be understood that there may be other embodiments which fall within the spirit and scope of the invention as defined by the following claims.

What is claimed:

1. In integrated machine systems wish multiple devices, an error code indexing and interpretation apparatus comprising:
   a) a first device containing operating error codes configured to send an error code on the occasion of a first device operating error;
   b) a second device connected to said first device, containing first device parameters wherein said first device parameters are selected from a group consisting of: product type, product family, product configuration and product software, for sending and receiving information configured to join said error code with said device parameters and to alert a user upon receipt of an error code from said first device; and c) a device error code database connected to said second device for storing an index of device error codes and associated error code correction procedures for devices, configured to display an associated error code correction procedure upon the receipt of an error code joined with the first device parameters.

2. The apparatus of claim 1 wherein said second device is connected to said device error code database through a remote network.

3. The apparatus of claim 2 wherein the remote network includes intranet and Internet connections.

4. The apparatus of claim 1 wherein the second device is connected to the device error code database through a web site on the Internet.

5. The apparatus of claim 1 further comprising multiple first devices.

6. The apparatus of claim 1 wherein said first device resides on said second device.

7. The apparatus of claim 1 wherein said first device and said device error code database reside on said second device.

8. The apparatus of claim 1 wherein said first device is selected from a group including: printer, scanner, mopier/copier, facsimile and phone.

9. The apparatus of claim 1 wherein said second device is a PC.

10. The apparatus of claim 1 wherein the connections are wireless.

11. In an electronically integrated business system with multiple business machines, an error code indexing and interpretation apparatus comprising:

a) a plurality of first machines containing operating error codes configured to send an error code on the occasion of a first machine operating error;

b) a second machine, containing first machine parameters wherein said first machines parameters are selected from a group consisting of: product type, product family, product configuration and product software, connected to said first machines for receiving and transmitting information, configured to join said operating error code with the appropriate first machine parameters upon receipt of an error code from a first machine;

c) a machine error code database connected to said second machine for indexing error codes for machines and storing associated error code correction procedures, configured to display the associated error code correction procedure upon receipt of the error code joined with the appropriate first machine parameters from said second machine.

12. In an electronically integrated business system with multiple business devices, a method of indexing and interpreting error codes comprising the steps of:

a) providing at least one first machine with error codes;

b) configuring the first machine to send an error code on the occasion of a first machine operating error;

c) connecting a second machine, for sending and receiving information, to the first machine and storing first machine parameters on said second machine wherein said first machine parameters are selected from a group consisting of: product type, product family, product configuration and product software;

d) configuring the second machine to join the error code with the appropriate first machine parameters on receipt of the error code from a first machine;

e) connecting a machine error code database to the second machine and storing an index of machine error codes and associated error code correction procedures on the machine error code database; and f) configuring the machine error code database to display an associated error code correction procedure upon receipt of an error code joined with the appropriate, machine parameters.

13. The method of claim 12 further comprising the step of connecting the second machine to the machine error code database through a network.

14. The method of claim 13 further comprising the step of selecting the network from a group of networks including intranet and Internet.

15. The method of claim 12 further comprising the step of selecting the at least one first machine from a group including: printer, spanner, mopier/copier, facsimile and phone.

16. The method of claim 12 further comprising the step of connecting the second machine to the machine error code database through a web site on the Internet.

17. In an electronically integrated business system with multiple business devices, computer code recorded on computer readable medium for indexing and interpreting error codes comprising:

a) computer code for a plurality of first machines containing operating error codes and for configuring the first machines to send an error code on the occasion of a first machine operating error;

b) computer code for a second machine for receiving and sending data, linked to said plurality of first machines, an for storing parameters for said first machines, wherein said first machines parameters are selected from a group consisting of: product type, product family, product configuration and product software, and joining an error code with the appropriate first machine parameters and for alerting a user upon receipt of the error code; and c) computer code for a machine error code database linked to said second machine for indexing machine error codes and storing associated error code correction procedures and for identifying the associated error correction procedure in response to the receipt of a particular error code joined with the appropriate first machine parameters from said second machine.

18. The invention of claim 17 further comprising computer code for connecting the plurality of first machines and the second machine through a network.

19. The invention of claim 17 further comprising computer code for connecting the second machine to the machine error code database through a website on the Internet.

20. The invention of claim 17 wherein the computer code for the plurality of first machines includes computer code for machines from a group including: printer, scanner, mopier/copier, facsimile, and phone.

* * * * *

UNITED STATES PATENT AND TRADEMARK OFFICE
CERTIFICATE OF CORRECTION

PATENT NO. : 6,934,890 B2 Page 1 of 1
APPLICATION NO. : 09/815192
DATED : August 23, 2005
INVENTOR(S) : Michael S. Lopke It is certified that error appears in the above-identified patent and that said Letters Patent is hereby corrected as shown below:

IN THE CLAIMS

Claim 17, Column 6, line 37, delete "an" and insert therefor --and--

Signed and Sealed this

Twenty-sixth Day of June, 2007

JON W. DUDAS
*Director of the United States Patent and Trademark Office*